United States Patent [19]

Mortensen et al.

[11] Patent Number: 5,571,848
[45] Date of Patent: Nov. 5, 1996

[54] METHOD FOR PRODUCING A MICROCELLULAR FOAM

[75] Inventors: Andreas Mortensen, Cambridge, Mass.; Thomas J. Fitzgerald, Erlangen, Germany

[73] Assignee: Massachusetts Institute of Technology, a Ma corp., Cambridge, Mass.

[21] Appl. No.: 375,936

[22] Filed: Jan. 20, 1995

[51] Int. Cl.⁶ ......................................................... C08J 9/26
[52] U.S. Cl. ........................... 521/61; 521/89; 521/91; 524/79; 524/80; 524/81; 501/80; 501/83; 264/56; 264/65; 264/66
[58] Field of Search ........................ 521/61, 82, 91; 524/79, 80, 81; 501/80, 83; 264/56, 65, 66

[56] References Cited

U.S. PATENT DOCUMENTS

| | | | |
|---|---|---|---|
| 3,812,224 | 5/1974 | Smith et al. | 264/28 |
| 4,100,233 | 7/1978 | Yajima et al. | 423/345 |
| 4,756,898 | 7/1988 | Hopper et al. | 423/449 |
| 4,806,290 | 2/1989 | Hopper et al. | 264/28 |
| 4,816,497 | 3/1989 | Lutz et al. | 522/46 |
| 4,847,027 | 7/1989 | Lu | 264/65 |
| 5,010,158 | 4/1991 | Colombier et al. | 528/28 |
| 5,021,533 | 6/1991 | Schwark | 528/21 |
| 5,051,215 | 9/1991 | Rabe et al. | 264/29 |
| 5,071,600 | 12/1991 | Deleeuw et al. | 264/22 |
| 5,155,181 | 10/1992 | Schwark | 525/474 |
| 5,167,881 | 12/1992 | Atwell et al. | 264/22 |

FOREIGN PATENT DOCUMENTS

| | | |
|---|---|---|
| 0245047A1 | 11/1987 | European Pat. Off. . |
| 0480225A1 | 4/1992 | European Pat. Off. . |
| 2517380 | 10/1976 | Germany . |
| 63-191932 | 3/1988 | Japan . |

OTHER PUBLICATIONS

Pekala et al., Journal of Materials Science, 22 (1987) 1840–1844.
Aubert et al., Journal of Materials Science, 26 (1991) 5741–5752.
Williams et al., Journal of Materials Science, 24 (1989) 4062–4067.
Sherman et al., Ceramic Bulletin, 70 (1991) 1025–1029.
Lemay et al., MRS Bulletin 15, (1990) 19–45.
Ichikawa et al., "Oxidation Reaction of Polycarbosilane", in *Silicon–Based Polymer Science A Comprehensive Resource*, Advances in Chemistry Series 224, American Chemical Society, Washington, D.C., 1990.
Ichikawa et al., Journal of Materials Science Letters, 6 (1987) 420–422.
Okamura et al., Ceram. Eng. Sci. Proc., 9 (1988) 909–918.
Okamura et al, Proc. 1st Japan International SAMPE Symposium, Nov. 28–Dec. 1, 1989, pp. 929–934.
Bibbo et al., Journal of Materials Science, 26 (1991) 5075–5080.
Taki et al., Journal of Materials Science Letters, 8 (1989) 918–920.

(List continued on next page.)

*Primary Examiner*—James J. Seidleck
*Assistant Examiner*—D. Truong
*Attorney, Agent, or Firm*—Florence Fusco McCann

[57] ABSTRACT

The invention provides a method for producing a microcellular foam of a curable material by replicating a dissolvable particle preform and leaching away the dissolvable particle preform to yield the microcellular foam. The foam can be a preceramic polymer microcellular foam which can be pyrolyzed to form a ceramic microcellular foam. A method for making a composite including steps of producing a ceramic microcellular foam which is subsequently infiltrated to form the composite is also provided as are microcellular foams, ceramic microcellular foams and composites prepared according to the method of the invention.

33 Claims, 4 Drawing Sheets

OTHER PUBLICATIONS

Taki et al., Journal of Materials Science, 15 (1980) 720–728.
Taki et al., Journal of Materials Science, 24 (1989) 1263–1267.
Taki et al., Journal of Materials Science Letters, 7 (1988) 209–211.
Taki et al., Journal of Materials Science Letters, 6 (1987) 826–828.
Hasegawa, Journal of Materials Science, 24 (1989) 1177–1190.
Ichikawa et al., Journal of Materials Science, 21 (1986) 4352–4358.
Okamura et al., Journal of Materials Science Letters, 4 (1985) 55–57.
Okamura et al., Journal of Materials Science Letters, 2, (1983) 769–771.
Okamura et al., Ceramics International, 13 (1987) 55–61.
Isaacs et al., Metallurgical Transactions A, 22A (1991) 2855–2862.
Wynne et al., Ann. Rev. Mater. Sci., 14, (1984) 297–334.
Baney et al., in *Emergent Process Methods For High–Technology Ceramics*, Materials Science Research, 17, (1982) Plenum Press, New York, pp. 253–261.
Gibson et al., *Cellular Solids Structure and Properties*, (Chapters 1 and 2) Pergamon Press, New York, 1988, pp. 1–22.
Sheldon et al., J. Am. Ceram. Soc., 75, (1992) 677–685.
Seyferth et al., "Synthesis of Some Organosilicon Polymers and Their Pyrolytic Conversion to Ceramics", in Silicon–Based Polymer Science A Comprehensive Resource, Advances in Chemistry Series 224, American Chemical Society, Washington, D.C., 1990.
Leiser et al., Ceramic Engineering and Science Proceedings, 6, (1985) 757–768.
Swinkels et al., Acta. Metalurgica, 29, (1981) selected pages.
Lange et al., Advanced Ceramic Materials, 2, (1987) 827–831.

5,571,848

METHOD FOR PRODUCING A MICROCELLULAR FOAM

BACKGROUND OF THE INVENTION

1. Field of the Invention

The invention relates to production of a microcellular foam.

2. Description of the Prior Art

Several processes exist for preparation of polymer foams and ceramic foams. These foam preparation techniques include slurry, chemical vapor deposition (CVD) aerogel, fiber co-pressing and binding, vapor phase reaction bonding, preceramic foam pyrolysis, phase separation, and replication processes.

According to the slurry process, a polymer foam is coated with a ceramic slurry. In subsequent processing steps, the slurry-coated polymer foam is exposed to elevated temperatures so that the slurry is sintered and the polymer burned away resulting in a foam having the composition of the ceramic and the microstructure of the polymer foam. The slurry process is relatively economical; however, the resulting ceramic foams are relatively weak and have a coarse-celled microstructure.

Chemical vapor deposition (CVD) processes also begin with a template foam, such as a carbon foam, which is infiltrated with the chemical vapor. The template foam serves as a substrate on which the chemical vapor decomposes to deposit the desired ceramic. The template foam can be left in place or removed by a further processing step such as pyrolysis. Typically, CVD processes are relatively expensive.

Aerogel processes produce foams directly from a sol-gel foam and, hence, are inherently limited to the sol-gel chemistries available and to the cellular microstructures they form.

Vapor-phase reaction bonding processes, such as those described in German Patent DE 2517380, require fabrication of an appropriate microstructure foam of one of the reactive elements, typically of an element such as silicon or carbon.

Preceramic polymers-based processes, in which preceramic polymers are pyrolyzed to form a ceramic foam, by nucleation and growth of gas bubbles within the preceramic polymer are described by Wynne et al., Ann. Rev. Mater. Sci., 14, 1984, 297–334 and Baney et al., in Conference on Emergent Process Methods for High-Technology Ceramics, Materials Science Research Series Vol. 17, Davis et al. Eds., North Carolina State Univ., 1982, Plenum Press, New York, 253–262. Such direct production results in foams characterized by microstructures of wide and poorly controlled cell size distribution and cell volume fraction.

All of these processes are either relatively expensive, or produce coarse or irregular foams. Thus, there exists a need for a relatively inexpensive method for producing foams, particularly, ceramic foams, such as ceramic compositions based on silicon, carbon, nitrogen, boron or titanium, having a fine, controlled, regular and open celled microstructure with no trace of a starting template foam.

SUMMARY OF THE INVENTION

The invention provides a method for producing a microcellular foam of a curable material, having a fine, open celled microstructure, including microcellular foams encompassing a wide range of ceramic chemistries without preparation of a starting template foam.

According to one aspect of the invention, a method for producing a microcellular foam of a curable material includes steps of providing dissolvable particles; packing the dissolvable particles into a preform; infiltrating the preform with a liquid curable material to form an infiltrated preform; cooling the infiltrated preform so that the liquid curable material hardens to form a hardened curable material infiltrated preform; and leaching the hardened curable material preform so that the dissolvable particles dissolve to form a hardened curable material microcellular foam. The liquid curable material can be a preceramic polymer that can be cured and pyrolyzed to form a ceramic microcellular foam.

Another aspect of the invention provides a method for producing a composite by making a ceramic microcellular foam according to the already-described method; infiltrating the ceramic microcellular foam with a liquid infiltrant to form an infiltrated ceramic microcellular foam; and cooling the infiltrated microcellular foam to solidify the liquid infiltrant to form a composite.

An object of this invention is preparation of a microcellular foam of a curable material without use of a starting template foam.

Another object of this invention is preparation of a composite including a ceramic microcellular foam by preparing a microcellular ceramic foam from a curable preceramic polymer without use of a starting template foam.

Other and further objects, features and advantages of the present invention will be readily apparent to those skilled in the art upon reading the description of preferred embodiments which follows.

DESCRIPTION OF PREFERRED EMBODIMENTS

Figure 1:
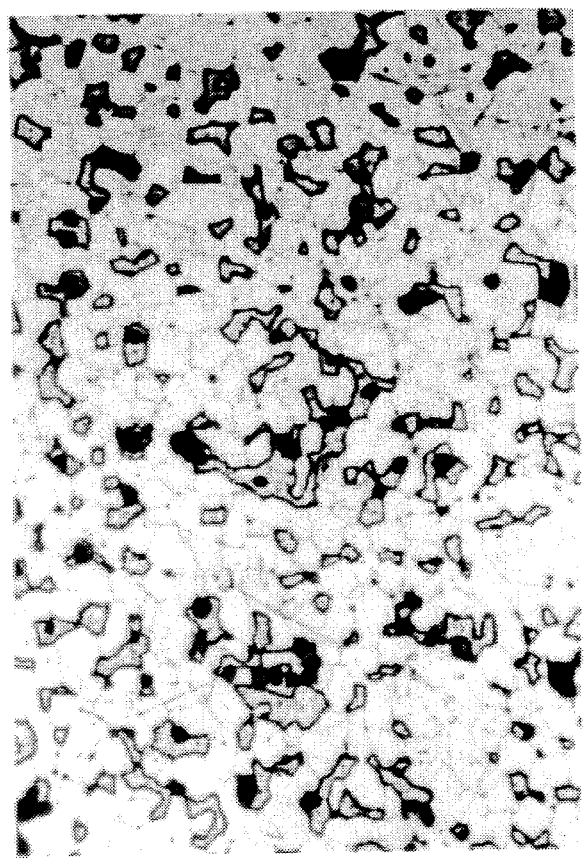
FIG. 1 is an optical micrograph showing the microstructure of a sintered salt compact.

As used herein in the specification and in the claims which follow, the term "microcellular" refers to a foam made up of "cells" or pores characterized by dimensions in the range of from about 1 µm to about 1 mm and solids fraction of greater than about 10 volume percent. "Solids fraction" refers to the volume of solid phase in a unit volume of foam material.

The invention provides a method for producing a microcellular foam using a leachable particulate material as a preform for a liquid curable material which after hardening forms a microcellular foam of hardened curable material. The liquid curable material has a viscosity appropriate to allow it to flow through the preform either spontaneously or when pressure is applied to it during the infiltration step. The process of "hardening" is the process whereby the curable material acquires sufficient viscosity so that it ceases to flow and retains a self-supporting shape and a material having these characteristics is said to be "hardened". As used in the specification and claims that follow, "curing" is a process whereby the curable material is altered so as to increase its high temperature viscosity to the point where it retains its foam-like microstructure upto temperatures at which it is transformed into a ceramic and a material having these characteristics is said to be "cured". For a preceramic Spolymer, curing typically includes creation of a sufficient number of cross-links within the polymer structure to allow it to remain solid up to pyrolysis temperatures.

The microcellular foam production process of the invention allows independent control of microstructural parameters, including foam cell size and foam density, which are coupled in conventional foam fabrication techniques. According to the method of the invention, it is possible independently to control the cell size of the foam by choosing the particle size of the dissolvable particles and control foam solids fraction by packing and sintering the dissolvable particles to a desired density.

The liquid curable material can be a preceramic polymer and the method can further include steps of curing the preceramic polymer to form a cured preceramic polymer microcellular foam, followed by pyrolyzing the cured preceramic polymer microcellular foam to form a ceramic microcellular foam. Pyrolysis involves heating the preceramic polymer microcellular foam so that its organic constituents are volatilized and remaining inorganic constituents react chemically to form the ceramic.

The dissolvable particles making up the preform can be substantially spherical in shape and be characterized by a particle size distribution in the range of from about 0.1 µm to about 1 cm, more preferably in the range of from about 1 µm to about 1 mm and most preferably in the range of from about 1 µm to about 100 µm. The dissolvable particles can be dissolved in an aqueous leaching agent or solvent and can be an inorganic salt such as sodium chloride or potassium chloride. The dissolvable particles can be packed so that they are homogeneously distributed to create open pore space and the packing process can additionally include steps of pressing and sintering the dissolvable particles.

Preform infiltration can include steps of evacuating any gas trapped within the preform before applying a pressure in the range of from about 1 atm to about 100 atm to the liquid curable material infiltrant. When the liquid curable material is a preceramic polymer, preform infiltration can be carried out at a temperature and in an atmosphere selected so that the preceramic polymer remains liquid. The preceramic polymer can pyrolyze to produce a ceramic having a ceramic composition based on an element such as silicon, nitrogen, carbon, oxygen, aluminum, titanium or boron or mixtures thereof. Preceramic polymers can be polymers well known to one skilled in the art such as polycarbosilane, polytitanocarbosilane, polysilazane, polydisilazane, $[B_{10}H_{12} \cdot \text{diamine}]_x$—based polymers or $[Ti(NR)_2]_x$—based polymers wherein R is a carbon-containing group, or mixtures thereof.

The infiltrated preform can be cooled to form a hardened curable material infiltrated preform at a cooling rate and in an atmosphere selected to avoid creation of internal stresses and cracking in the infiltrated preform. During cooling, pressure, which can be in the range of from about 1 atm to about 100 atm, can be applied so that the liquid curable material is made to flow to compensate for the volume changes that occur upon hardening of the liquid curable material.

Leaching of the hardened curable material infiltrated preform can be accomplished by immersing the hardened curable material infiltrated preform in a leaching agent so that the dissolvable particles dissolve. Removal of the dissolvable preform prior to curing or pyrolysis avoids creation of internal stresses due to differences in thermal or transformation strain between the dissolvable preform and the hardened curable material or any derivative thereof. Also, thermal stability requirements on the preform material are relaxed since it need not withstand any elevated temperatures such as may be encountered during curing or pyrolysis.

Curing of the hardened curable material microcellular foam can be carried out so that the preceramic polymer does not melt during the pyrolyzing step. Curing can include a step of chemically reacting the preceramic polymer with oxygen. The uncured preceramic polymer microcellular foam dimensions and heating rate can be selected to avoid cracking or melting of the hardened curable material microcellular foam during the curing step. Irradiation with an energy source such as an electron beam, ultraviolet radiation, gamma radiation or a plasma or combinations thereof or heating in an inert atmosphere can also be used to cure the preceramic polymer.

Curing rate refers to the rate at which the hardened curable material, which can be a preceramic polymer, structure is altered by oxidation, irradiation or any of the other curing methods described above used singly or in combination. Curing rate and heat removal rate from the hardened curable material microcellular foam can be independently controlled to avoid melting or cracking of the hardened curable material microcellular foam. Curing of the hardened curable material is highly sensitive to processing conditions. Processing conditions must be controlled so that cracking or melting of the material during the curing process are both avoided. Since curing is typically an exothermic process which proceeds more rapidly as temperature is increased, care must be taken to control the temperature of the curing material to be sure that heat evolved during curing does not destroy the foam.

The rate of the curing process can be designed to accommodate larger samples, typically in the range of from about 5 mm to about 5 cm. The curing rate of an oxidative curing process can be controlled by controlling the oxygen partial pressure.

In curing polycarbosilane preceramic polymer, as well as other materials, introduction of oxygen into the polycarbosilane can be avoided by using an oxygen-free curing process including irradiation with electrons, exposure to gamma rays in air or in vacuum, exposure to chemical agents, such as chlorine or hydrogen peroxide, plasma treatment, or exposure to ultraviolet radiation. The foregoing non-oxidative curing techniques can allow better temperature control during curing and, hence, can satisfactorily produce larger size foam samples. Irradiation processes capable of penetrating into the entire bulk of the uncured material permit independent control of the rate of cross-linking and of heat extraction from the curing material. Curing kinetics can be controlled by controlling radiation flux while initial curable material temperature and surrounding heat sink temperatures can be chosen to produce the desired rate of heat removal.

The cured preceramic polymer microcellular foam can be pyrolyzed at a pyrolysis temperature and in an atmosphere selected so that the resulting ceramic microcellular foam is strong and stable at elevated temperatures.

A method for producing a composite is also provided that includes the already-described steps for producing a ceramic microcellular foam and, in addition, has steps of infiltrating the ceramic microcellular foam with a liquid infiltrant to form an infiltrated ceramic microcellular foam and cooling the infiltrated ceramic microcellular foam to solidify the liquid infiltrant and form a solid composite.

The liquid infiltrant can be a liquid metal such as aluminum, magnesium, lead, tin, copper, iron, nickel, titanium, or silicon or mixtures thereof. The liquid infiltrant can also be an alloy such as aluminum, magnesium, lead, tin, copper, iron, nickel, titanium or silicon-based alloys or mixtures thereof. Liquid intermetallic compounds such as aluminum, magnesium, lead, tin, copper, iron, nickel, titanium, or silicon-based intermetallic compounds or mixtures thereof can also be used as the liquid infiltrant. The liquid infiltrant can also be a polymer. Finally, the liquid infiltrant can itself be a preceramic polymer such as polycarbosilane, polytitanocarbosilane, polysilazane, polydisilazane, a $[B_{10}H_{12} \cdot diamine]_x$—based polymer or a $[Ti(NR)_2]_x$—based polymer wherein R is a carbon-containing group or mixtures thereof that can be pyrolyzed in a subsequent processing step to form a ceramic matrix composite.

Microcellular foams, ceramic microcellular foams and composites prepared according to the methods of the invention are also provided.

In order further to illustrate the present invention, the following examples are provided. The particular compounds, processes and conditions utilized in the examples are meant to be illustrative of the present invention and are not limited thereto.

EXAMPLE 1

The following example is provided to illustrate production of a SiC/Al composite including a microcellular ceramic foam according to the method of the invention.

A sodium chloride preform was prepared from fine grain sodium chloride with 1.5 weight percent tricalcium phosphate anti-caking agent (TCP-66™ made by Akzo, Clarks Summit, Pa.) additive. TCP-66™ was selected because it is pre-ground, inexpensive and easy to work with.

The as-received sodium chloride was sifted to classify it according to grain size. Approximately 100 ml of as-received sodium chloride was poured onto a stack of brass and stainless steel sieves 8 inches in diameter and agitated for approximately two hours using a Tyler (Cleaveland, Ohio) Rotap™ sieve shaker. The mesh sizes used were 140, 170, 270, and 325 which correspond, respectively, to grain sizes of 106 μm, 90 μm, 75 μm, 53 μm and 45 μm. Sieves finer than 325 mesh were not used because of difficulty with passing the sodium chloride through such screens. It was also noted that sifting sodium chloride with glycerin as an anti-caking agent was slow and comparatively ineffective.

Sifted sodium chloride of each of the grain sizes set forth above was then placed in quartz tubes lined with Grafoil™ (UCAR, Cleaveland, Ohio) graphite foil to prevent the salt from sticking to the quartz tube during sintering. Plugs of Fiberfrax™ (Carborundum, Niagara Falls, N.Y.) alumina-silica insulation, also lined with Grafoil™ were used to seal the ends of the tubes. Each tube was tapped by hand to make the sodium chloride settle. (It is noted that higher packing density preforms can be prepared by compressing the salt in a Grafoil™-lined steel die using a 20-ton press.)

The tapped sodium chloride compacts were then placed in a Lindberg (Chicago, Ill.) 55346 three-zone tube furnace under a flowing argon atmosphere and sintered at 795° C. for periods ranging from between one to about six days depending upon the grain size of the salt as shown in Table I.

TABLE I

| Grain Size (μm) | Temperature (°C.) | Sintering Time (days) |
| --- | --- | --- |
| <45 | 795.00 | 1.00 |
| 45–53 | 795.00 | 4.00 |
| 53–75 | 795.00 | 4.00 |
| 75–90 | 795.00 | 6.00 |

Sintering cycles were developed to yield salt compacts having smooth pore surfaces and a volume fraction of salt of about 50%; however, significant alteration of salt volume fraction can be effected by varying sintering conditions.

Figure 2:
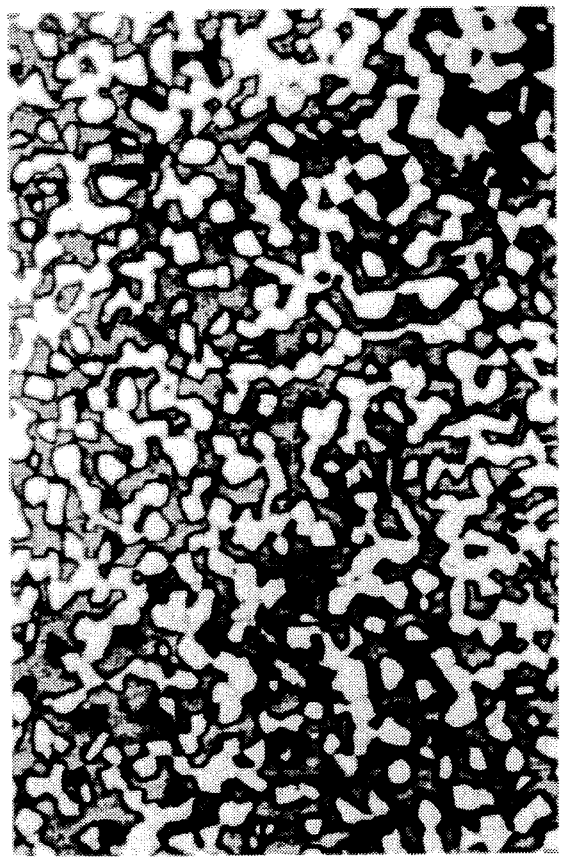
FIG. 2 is an optical micrograph showing the microstructure of a sintered salt compact.

FIGS. 1 and 2 are micrographs that show sintered sodium chloride compacts prepared according to the foregoing method. In the micrographs the light phase is salt and the dark phase is epoxy, which is used in sample preparation for microscopy as will be described in greater detail. FIG. 1 shows salt particles having sizes in the range of from about 43–53 μm sintered for four days at 795° C. and FIG. 2 shows salt particles having sizes in the range of from about 53–75 μm compressed to 10,000 psi and then sintered for four days at 795° C.

The salt compact samples were prepared for reflective light microscopy by vacuum infiltration of the compacts with low viscosity epoxy. After the epoxy had set, the samples were ground flat with 600 grit silicon carbide paper and then polished on a nylon polishing cloth using successive liberal amounts of 9 μm, 3 μm and 1 μm diamond paste without lubricating fluid. Samples were cleaned in a pentane ultrasonic bath between polishing steps. As a final preparation step for microscopy, contrast was enhanced by etching the salt phase in an ultrasonic ethanol bath for 15 seconds.

For preparation of the microcellular foams, the porous sodium chloride compacts were infiltrated with liquid polycarbosilane, preferably using pressure infiltration to achieve a relatively high, by comparison with pressureless infiltration, infiltration rate and avoid trapping air and effluent gases within the cores of the sodium chloride compacts. Pressure infiltration was accomplished using apparatus described in J. A. Isaacs, et al., Metall. Trans., 22A, 1991, 2855–2862, which is incorporated herein by reference.

For pressure infiltration, sodium chloride compacts were placed in the bottom of a closed-end pyrex tube and the pyrex tube then filled with an equivalent volume of polycarbosilane. The pyrex tube and contents were then placed into a stainless steel holder and lowered into a pressure vessel. The pressure vessel was sealed, evacuated and pressurized with 1 atm of argon. The pyrex tube was then heated to 435° C. and pressurized with argon at 7MPa to force the liquid polycarbosilane into the pores of the porous sodium chloride compact. The infiltrated sodium chloride compacts were then allowed to harden under pressure. Once cooled, the hardened, infiltrated sodium chloride compacts were dislodged from the pyrex tube and excess polycarbosilane removed using a razor blade.

The salt was leached from the hardened, infiltrated compacts using water as the leaching agent. The hardened, infiltrated compacts were placed in a pyrex beaker which was then evacuated and sealed. The inlet of the beaker was immersed in distilled water and the seal was broken to allow the distilled water to come into contact with the hardened, infiltrated sodium chloride compact. Once the beaker became filled with water, the hardened infiltrated compacts were transferred to a large bath of continuously stirred distilled water. The bath water was changed daily for approximately three weeks. The frequency of water bath change was determined based upon an elementary estimation of the rate of salt diffusion through the polycarbosilane foam. At the end of the leaching period, the remaining polycarbosilane foams were removed from the water bath, placed on wire screens, and dried in a convection oven. Samples were dried at 35° C. for 12 hours, followed by 12 hours at 50° C., and 24 hours at 75° C.

The dried polycarbosilane foam was then cured by direct oxidation at elevated temperature using a Thermolyne (Dubuque, IA) 9000 series convection oven (Model 47335), typically by raising oven temperature from 100° C. to 190° C. at a ramp rate of 0.02° C./minute to convert the polycarbosilane from a thermoplastic to a thermoset. The polycarbosilane foams were placed in the convection oven to insure good air circulation and, thus, avoid heat buildup within the samples.

Finally, the cured polycarbosilane foams were pyrolyzed in a Lindberg (Chicago, Ill.) 55346 three-zone tube furnace containing an argon atmosphere according to a pyrolysis cycle of ramping temperature from room temperature to 1100° C. at a rate of 0.5° C./minute to produce a SiC ceramic foam. The cured cylindrically shaped polycarbosilane foams were kept on rollers during pyrolysis which allowed the cured foams to shrink unconstrained, thereby minimizing cracking of the cured foams due to shrinkage.

Figure 3:
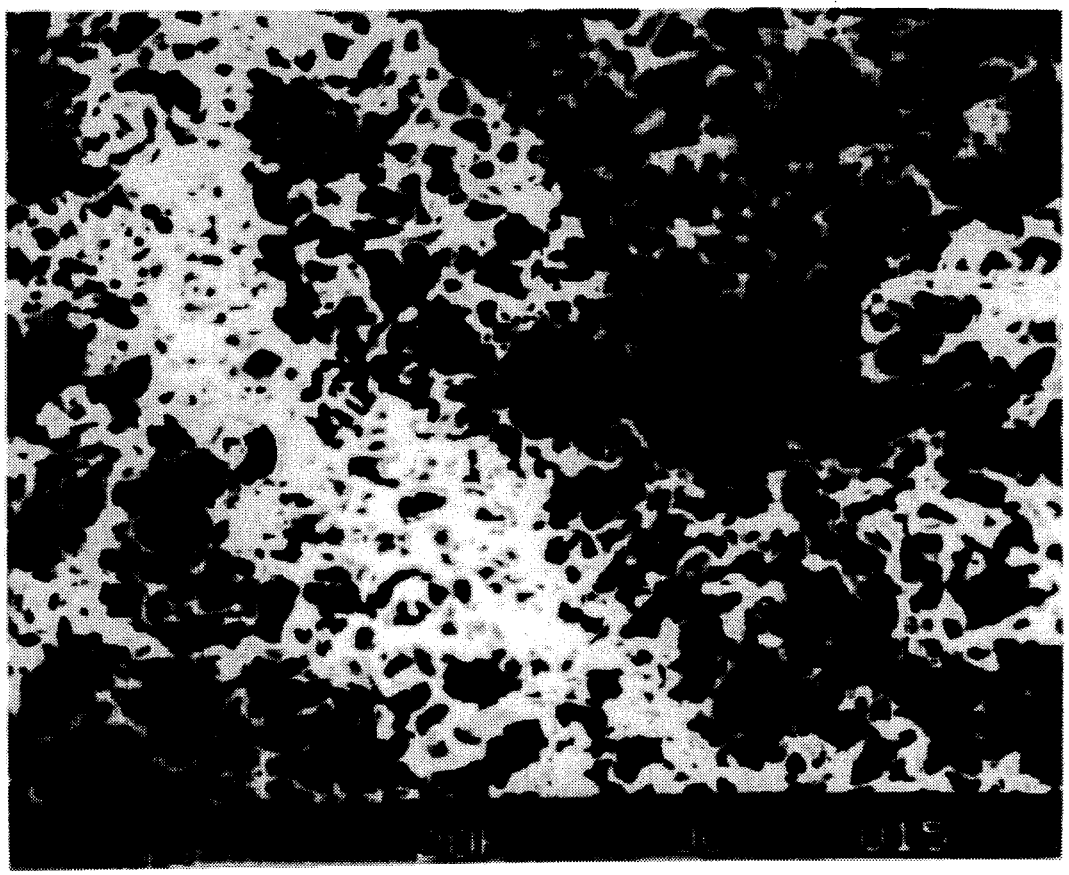
FIG. 3 is a scanning electron microscope (SEM) image of a SiC foam fracture surface.

FIG. 3 is a scanning electron microscope (SEM) image of a typical fracture surface of a SiC foam produced according to the foregoing method. The foam has a relatively smooth internal surface with open and uniformly sized foam cells and, as demonstrated by microscopic observation at higher magnification, dense cell struts. Cell sizes as small as 10 µm, a cell size approximately an order of magnitude smaller than those obtained using conventional processes, can be obtained using the foregoing method.

Figure 4:
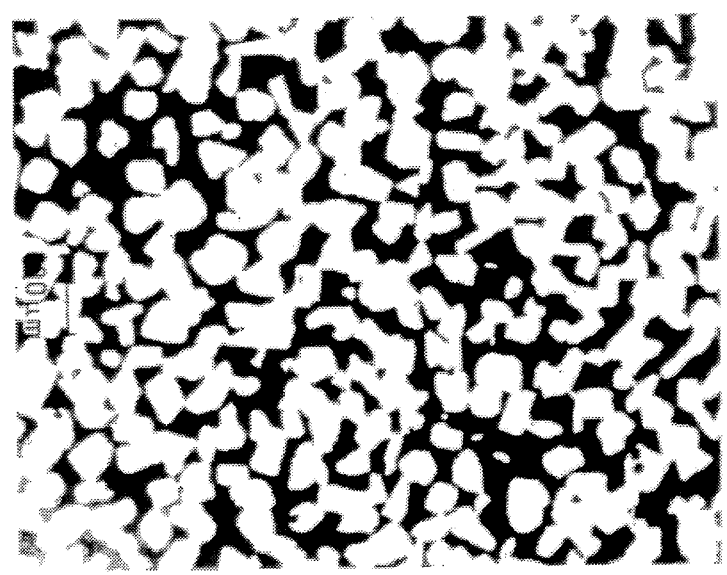
FIG. 4 is an optical micrograph showing the microstructure of a SiC microcellular foam reinforced aluminum composite.

The SiC foams were then pressure infiltrated with molten copper or aluminum to form metal matrix composites having interpenetrating metal and ceramic phases as shown in the optical micrograph of FIG. 4.

FIG. 4 shows a SiC microcellular foam reinforced with aluminum, having 35% volume fraction SiC, the dark phase in the micrograph, with the remainder aluminum, the light phase in the micrograph. This composite was produced from a sodium chloride compact having a sodium chloride particle size in the range of from about 53–75 µm. The micrograph of FIG. 4 shows the regularity and fineness of foam microstructure as well as the lack of porosity in the finished metal matrix composite due to the open-celled and pore-free nature of the ceramic foam. Measurements of the coefficients of thermal expansion and stability under thermal cycling of the metal matrix composites produced according to the method of the invention indicate that these materials are promising for applications that require combined high thermal conductivity and dimensional stability under variable temperature conditions.

EXAMPLE 2

The following example is provided to illustrate the importance of controlling curing conditions during production of microcellular preceramic polymer foams.

Polycarbosilane preceramic polymer foams were prepared according to the method described in Example 1. Since, depending on curing conditions, cured polycarbosilane foams can be white and have high mechanical integrity or can be partly melted or cracked and brownish and lack mechanical integrity, controlled experiments were designed to better understand heat generation and transport during the curing process.

Figure 5:
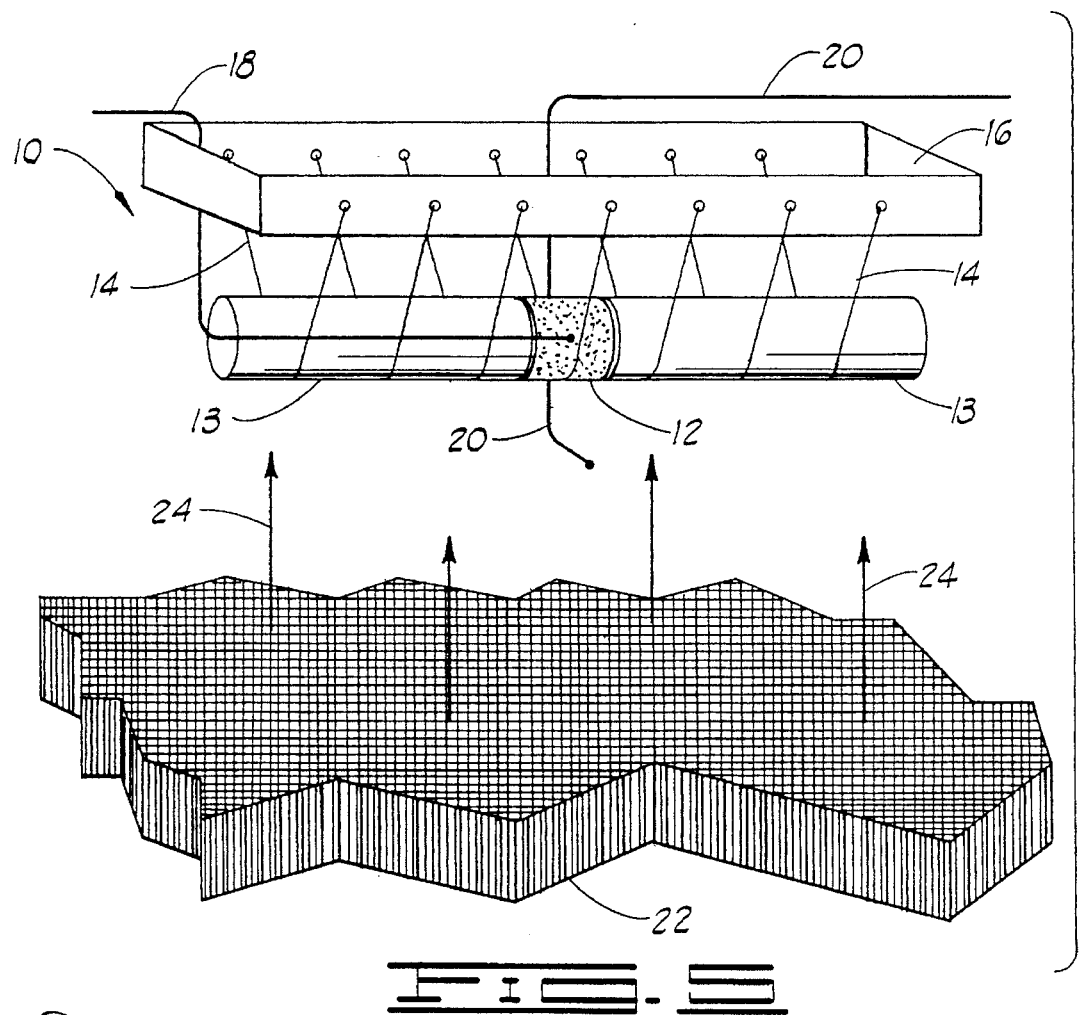
FIG. 5 is a schematic illustration of an experimental apparatus used to study foam curing behavior.

Using foam temperature measurement assembly 10 shown in FIG. 5, sample and ambient temperature were simultaneously recorded during curing. Polycarbosilane foam cylinder 12 was placed between two fibrous ceramic insulator cylinders 13 and hung in position with thin (0.003") stainless steel wires 14 suspended from frame 16. A thin type K thermocouple 18 was strung through insulator cylinder 13 and terminated in the center of foam cylinder 12. A second type K thermocouple 20 was placed approximately 3 cm below foam cylinder 12 to measure ambient temperature. Assembly 10 was placed in a Thermolyne (Dubuque, Iowa) 9000 series convection oven equipped with a digital programmable temperature controller. A sheet of aluminum honeycomb 22 was placed below cylinders 12 and 13 to direct a vertical forced air flow in the direction given by arrows 24.

Signals from thermocouples 18 and 20 were read by two thermocouple indicators not shown and their output sent to a computer via an analog/digital converter. Thermocouples 18 and 20 were calibrated using the melting point of tin at elevated temperatures and a mercury thermometer at room temperature.

Six separate curing experiments were performed on foam samples prepared from the same batch, having a cell size of approximately 100 µm and a relative density with respect to the pore-free material of 0.40. The six samples differed with respect to sample diameter.

For the curing experiments, each of the six foam samples was placed in the same location in the center of the oven. For each foam sample, temperature was raised from room temperature to 100° C. at a rate of 1° C./min and held at 100° C. for 1 hour. Thereafter, for each foam sample, temperature was raised to 190° C. at the rate shown in Table II. (For samples A and C, the second temperature ramp began at 96.5° C. and ended at 186.5° C.)

Table II summarizes curing experiment results. In Table II, $T_{crit}$ is defined as the temperature at which a temperature exotherm or a rapidly increasing temperature, thermal runaway, was detected. Samples which cured successfully (samples A, D and F) displayed a maximum exotherm during the curing cycle and had an unaltered appearance after curing. Samples which had undergone thermal runaway appeared reddish brown in color and cracked into pieces (sample B), or were yellow with signs of partial melting (sample C). Heat transfer between foam cylinder 12 and ceramic insulator cylinders 13 was found to be negligible by comparison to radial heat exchange with the surrounding atmosphere in the oven.

TABLE II

| | Diameter (cm) | Ramp Rate (°C./min) | Curing Results (actual) | Curing Results (predicted by computer model) | $T_{crit}$ (actual °C.) | $T_{crit}$ (predicted by computer model °C.) |
|---|---|---|---|---|---|---|
| A | 2.00 | 0.02 | stable | stable | 161.00 | 160.00 |
| B | 2.00 | 0.04 | unstable | unstable | 156.50 | 160.00 |
| C | 2.00 | 0.10 | unstable | unstable | 151.00 | 148.00 |
| D | 1.27 | 0.04 | stable | stable | 183.00 | 172.50 |
| E | 1.27 | 0.10 | unstable | unstable | 182.50 | 172.50 |
| F | 0.76 | 0.10 | stable | stable | 189.00 | 187.50 |

The heat transfer coefficient between the polycarbosilane foam samples and the ambient atmosphere was also measured.

Figure 6:
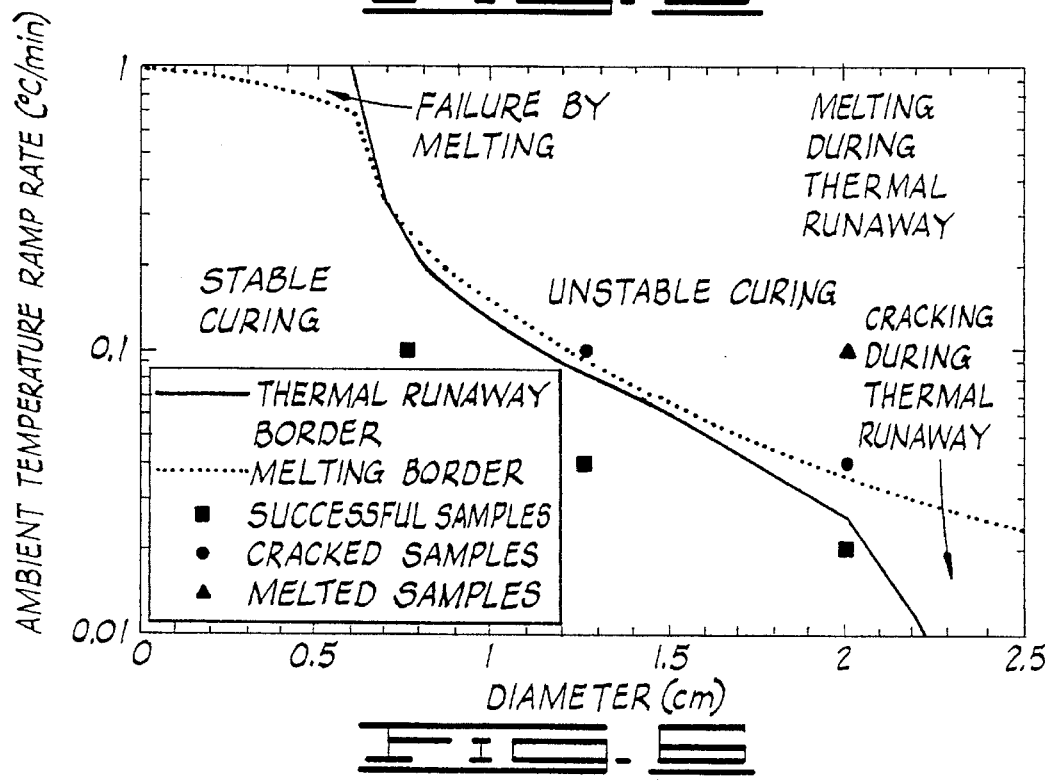
FIG. 6 is a processing map for curing polycarbosilane foam cylinders of different diameters.
Figure 7:
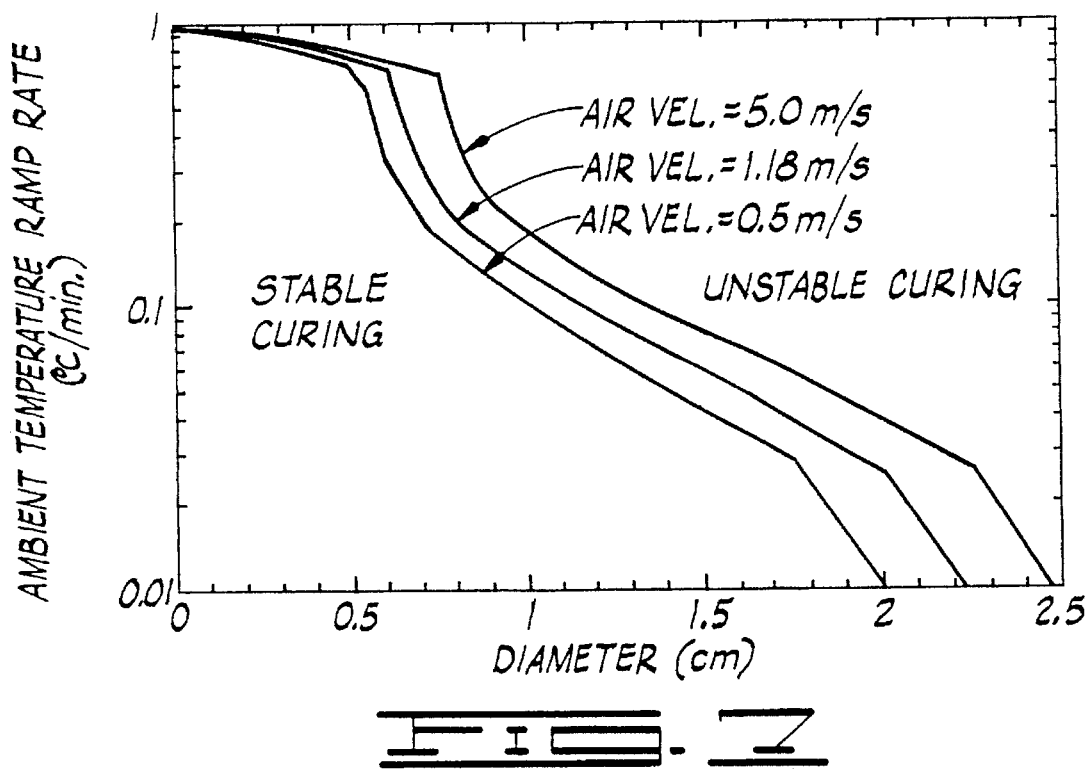
FIG. 7 is a processing map for curing polycarbosilane foam cylinders exposed to ambient air of different velocities.
Figure 8:
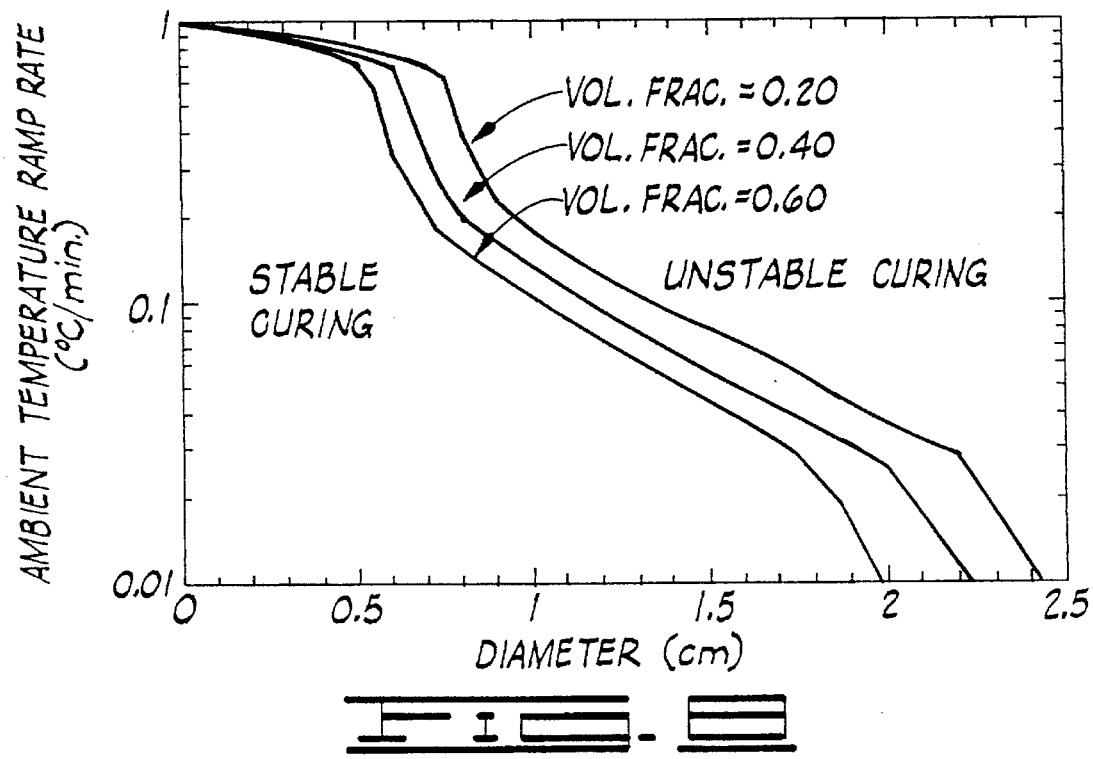
FIG. 8 is a processing map for curing polycarbosilane foam cylinders having different solids contents.

Using the experimental data thus obtained and a numerical computer model developed to simulate the curing behavior of macroscopic polycarbosilane cylinders, processing maps shown in FIGS. 6, 7 and 8 were prepared to explore the effects of changes in process parameters on foam curing behavior.

FIG. 6 is a processing map corresponding to samples A through F with air velocity equal to 1.175 m/s and relative foam density of 0.40. Comparison of the processing map with the results obtained for samples A through F as summarized in Table II shows that samples A, D and F which cured successfully fall in the predicted stable region of the processing map. Samples B and E, which experienced thermal runaway but showed no signs of melting, fall slightly above the stable line and almost within the predicted cracking regime. Finally, sample C, which experienced thermal runaway and showed signs of melting, falls above the stability line and well within the predicted melting regime.

Generally, the processing map indicates that smaller samples are more stable, provided that temperature within the oven is increased at a ramp rate roughly below 1° C./minute. These samples are thus restricted to geometries having at least one dimension below about 2 cm for an oxidation curing process. Larger samples can be successfully cured using an alternate curing procedure such as irradiation. Using irradiation, radiation flux intensity and irradiation time can be controlled to optimize the rate of heat evolution, and foam mechanical and thermal stability properties.

FIGS. 7 and 8, respectively, show the predicted effects of air velocity and polycarbosilane foam relative density on curing behavior. Stability increases with increasing air velocity and decreasing relative density; however, these effects are not very strong, since a ten-fold increase in velocity, or a halving of relative foam density only increases the maximum stable sample size by 25% for a given temperature ramping rate.

What is claimed is:

1. A method for producing a microcellular foam of a curable material comprising:
   (1) providing dissolvable particles;
   (2) packing said dissolvable particles to form a preform;
   (3) infiltrating said preform with a liquid curable material to form an infiltrated preform;
   (4) cooling said infiltrated preform so that said liquid curable material hardens to form a hardened curable material infiltrated preform;
   (5) leaching said hardened curable material infiltrated preform so that said dissolvable particles dissolve to form a hardened curable material microcellular foam characterized by pores having dimensions in the range of from about 1 µm to about 1 mm.

2. The method of claim 1 wherein in step (3) said liquid curable material is a preceramic polymer and further comprising steps of:
   (6) curing said hardened curable material microcellular foam so that said preceramic polymer cures to form a cured preceramic polymer microcellular foam; and
   (7) pyrolyzing said cured preceramic polymer microcellular foam so that said cured preceramic polymer microcellular foam is pyrolyzed to form a ceramic microcellular foam.

3. The method of claim 1 wherein said dissolvable particles are substantially spherical particles and are further characterized by a particle diameter size distribution in the range of from about 0.1 µm to about 1 cm.

4. The method of claim 1 wherein said dissolvable particles are dissolvable in an aqueous leaching agent.

5. The method of claim 4 wherein said dissolvable particles are selected from the group consisting of sodium chloride and potassium chloride particles.

6. The method of claim 1 wherein said step (2) of packing is carried out so that said dissolvable particles are homogeneously distributed within said preform to create open pore space.

7. The method of claim 6 further including steps of pressing and sintering said dissolvable particles to form said preform.

8. The method of claim 1 wherein said preform contains a gas and step (2) of infiltrating further includes evacuating said gas before applying pressure in the range of from about 1 atm to about 100 atm to form said infiltrated preform.

9. The method of claim 2 wherein said step (2) of infiltrating is carried out at a temperature and in an atmosphere selected so that said preceramic polymer remains liquid.

10. The method of claim 2 wherein said preceramic polymer pyrolyzes in step (7) to yield a ceramic characterized by a ceramic composition based on an element selected from the group consisting of silicon, nitrogen, carbon, oxygen, aluminum, titanium and boron and mixtures thereof.

11. The method of claim 10 wherein said preceramic polymer is selected from the group consisting of polycarbosilane, polytitanocarbosilane, polysilazane, polydisilazane, $[B_{10}H_{12} \cdot diamine]_x$-based polymers and $[Ti(NR)_2]_x$-based polymers wherein R is a carbon-containing group and mixtures thereof.

12. The method of claim 1 wherein said step (4) of cooling is carried out at a cooling rate and in an atmosphere selected to avoid internal stresses and cracking in said infiltrated preform.

13. The method of claim 1 further comprising a step of applying pressure during said step (4) of cooling so that flow of said liquid curable material compensates volume changes which occur upon hardening of said liquid curable material.

14. The method of claim 13 wherein said pressure is in the range of from about 1 atm to about 100 atm.

15. The method of claim 1 wherein said step (5) of leaching said hardened curable material infiltrated preform further comprises a step of immersing said hardened curable material infiltrated preform in a leaching agent so that said dissolvable particles dissolve.

16. The method of claim 2 wherein said step (6) of curing said hardened curable material microcellular foam is carried out so that said preceramic polymer does not melt during said step (7) of pyrolyzing.

17. The method of claim 2 wherein said step (6) of curing said hardened curable material microcellular foam further comprises a step of chemically reacting said preceramic polymer with oxygen.

18. The method of claim 17 wherein said hardened curable material microcellular foam is further characterized by an uncured preceramic polymer microcellular foam dimension and said uncured preceramic polymer foam dimension and heating rate are selected to avoid deterioration of said hardened curable material microcellular foam during said curing step.

19. The method of claim 2 wherein said step (6) of curing said hardened curable material microcellular foam further comprises a step of irradiating said preceramic polymer with an energy source selected from the group consisting of an electron beam, ultraviolet radiation, gamma radiation and a plasma and combinations thereof.

20. The method of claim 2 wherein said step (6) of curing said hardened curable material microcellular foam further comprises a step of heating said preceramic polymer in an inert atmosphere.

21. The method of claim 2 wherein said step (6) of curing is further characterized by a curing rate and a heat removal rate from said hardened curable material microcellular foam and wherein said curing rate and said heat removal rate are independently controlled to avoid melting or cracking of said hardened curable material microcellular foam.

22. The method of claim 2 wherein said step (7) of pyrolyzing is carried out at a pyrolysis temperature and in an atmosphere selected so that said ceramic microcellular foam is strong and remains stable at elevated temperatures.

23. A method for producing a composite comprising:

(1) providing dissolvable particles;

(2) packing said dissolvable particles to form a preform;

(3) infiltrating said preform with a liquid curable material to form an infiltrated preform;

(4) cooling said infiltrated preform so that said liquid curable material hardens to form a hardened curable material infiltrated preform;

(5) leaching said hardened curable material infiltrated preform so that said dissolvable particles dissolve to form a hardened curable material microcellular foam characterized by pores having dimensions in the range of from about 1 μm to about 1 mm;

(6) curing said hardened curable material microcellular foam so that said preceramic polymer cures to form a cured preceramic polymer microcellular foam characterized by pores having dimensions in the range of from about 1 μm to about 1 mm;

(7) pyrolyzing said cured preceramic polymer microcellular foam so that said cured preceramic polymer microcellular foam is pyrolyzed to form a ceramic microcellular foam characterized by pores having dimensions in the range of from about 1 μm to about 1 mm;

(8) infiltrating said ceramic microcellular foam with a liquid infiltrant to form an infiltrated ceramic microcellular foam; and (9) cooling said infiltrated ceramic microcellular foam to solidify said liquid infiltrant and form a composite.

24. The method of claim 23 wherein said liquid infiltrant is a liquid metal selected from the group consisting of aluminum, magnesium, lead, tin, copper, iron, nickel, titanium and silicon and mixtures thereof.

25. The method of claim 23 wherein said liquid infiltrant is a liquid alloy selected from the group consisting of aluminum, magnesium, lead, tin, copper, iron, nickel, titanium and silicon-based alloys and mixtures thereof.

26. The method of claim 23 wherein said liquid infiltrant is a liquid intermetallic compound selected from the group consisting of aluminum, titanium, nickel, niobium and iron-based intermetallic compounds and mixtures thereof.

27. The method of claim 23 wherein said liquid infiltrant is a liquid preceramic polymer selected from the group consisting of polycarbosilane, polytitanocarbosilane, polysilazane, polydisilazane, $[B_{10}H_{12} \cdot diamine]_x$-based polymers and $[Ti(NR)_2]_x$-based polymers wherein R is a carbon-containing group and mixtures thereof and further comprising a step of pyrolyzing said composite so that said preceramic polymer is pyrolyzed to form a ceramic matrix composite.

28. A microcellular foam prepared according to the method of claim 1.

29. A ceramic microcellular foam prepared according to the method of claim 2.

30. A composite prepared according to the method of claim 23.

31. A composite prepared according to the method of claim 24.

32. The method of claim 1 wherein said dissolvable particles are substantially spherical particles and are further characterized by a particle diameter size distribution in the range of from about 1 μm to about 1 mm.

33. The method of claim 1 wherein said dissolvable particles are substantially spherical particles and are further characterized by a particle diameter size distribution in the range of from about 1 μm to about 100 μm.

* * * * *